United States Patent

[11] 3,608,656

[72] Inventor Charles R. Pettis, Jr.
 Ithaca, N.Y.
[21] Appl. No. 784,564
[22] Filed Dec. 18, 1968
[45] Patented Sept. 28, 1971
[73] Assignee Hi-Speed Checkweigher Co., Inc.
 Ithaca, N.Y.

[54] FLUIDIC CONTROL SYSTEM
 9 Claims, 2 Drawing Figs.
[52] U.S. Cl. .................................................. 177/70,
 177/108, 177/114, 177/122
[51] Int. Cl. ............................................. G01g 19/22
[50] Field of Search............................................ 177/50, 70,
 121–122, 105, 106, 114, 108

[56] References Cited
 UNITED STATES PATENTS
2,071,443  2/1937  Weckerly ..................... 177/121
2,264,562 12/1941  Bryant et al. ................. 177/122 X
2,751,180  6/1956  Howard......................... 177/50
2,860,848 11/1958  Wearer et al. ................. 177/122
3,101,801  8/1963  Miller............................ 177/70
3,343,616  9/1967  Fellows ......................... 177/121

Primary Examiner—Richard B. Wilkinson
Assistant Examiner—George H. Miller, Jr.
Attorney—Bean & Bean ABSTRACT: A fluidic control for a batch material weigher including a fluidic transducer adapted to produce fluidic control signals indicative of material induced deflections of a weighing scale, fluidic gates adapted to terminate feeding of the material onto the weighing scale in response to the control signals, and means to adjustably control the response of the gates. Adjustment of the response of the fluidic gates may be servo-controlled by feedback from a net weighing apparatus in order to obtain batches of material at predetermined uniform weights.

PATENTED SEP 28 1971

3,608,656

INVENTOR.
CHARLES R. PETTIS, Jr

BY

Bean + Bean
ATTORNEYS 3,608,656

FLUIDIC CONTROL SYSTEM

SUMMARY OF THE INVENTION

The present invention broadly relates to systems for dispensing particulate material to sequentially form batches of uniform weight. Uniform weight batches may be obtained by a dispensing operation which involves an initial or bulk feeding stage characterized by relatively high-volume material flow and a terminal or fine-feeding stage characterized by relatively low volume material flow, wherein there is employed means for controlling the periods of the stages and thus the weight of batch forming material feed to a scale device. A suitable check-weighing system may be employed in combination with the present fluidic control to check the batch weights in a subsequent weighing operation and to make corrective adjustments of at least the terminal or fine feeding stage of the dispensing operation, when necessary, on a batch-to-batch basis.

The present invention envisions the combination of a fluidic transducer of the type disclosed in my copending application, Ser. No. 777,071 filed Nov. 19, 1968, and a pair of fluidic gates in the form of Schmitt triggers. The fluid transducer is responsive to the deflections of a scale device, such that there is produced a pair of fluidic control signals, which are passed one to each of the Schmitt triggers for the purpose of controlling the bulk and fine-feeding stages of the dispensing operation. The bias applied to the respective Schmitt triggers may be selectively adjusted, so as to control the trip points at which bulk and fine-feeding of material onto the scale device are terminated.

The fluidic control circuit of the present invention envisions that the material feed and scale dumping operations may be either automatic or manually initiated.

When the present invention is utilized in combination with a check weighing system, adjustments of the bias applied to the Schmitt trigger used in terminating the fine-feeding stage may be servo-controlled on the basis of batch weight inaccuracies measured by the check weigher. The Drawings The nature and mode of operation of the fluidic control of the present invention will now be described with particular reference to the accompanying drawings wherein:

FIG. 1 is a schematic showing of the fluidic control according to the present invention; and FIG. 2 is a schematic view of a check-weighing apparatus showing the utilization of a servocontrol for effecting adjustment of the fine feed trip point of a bulk weigher.

DETAILED DESCRIPTION

Figures 1, 2:
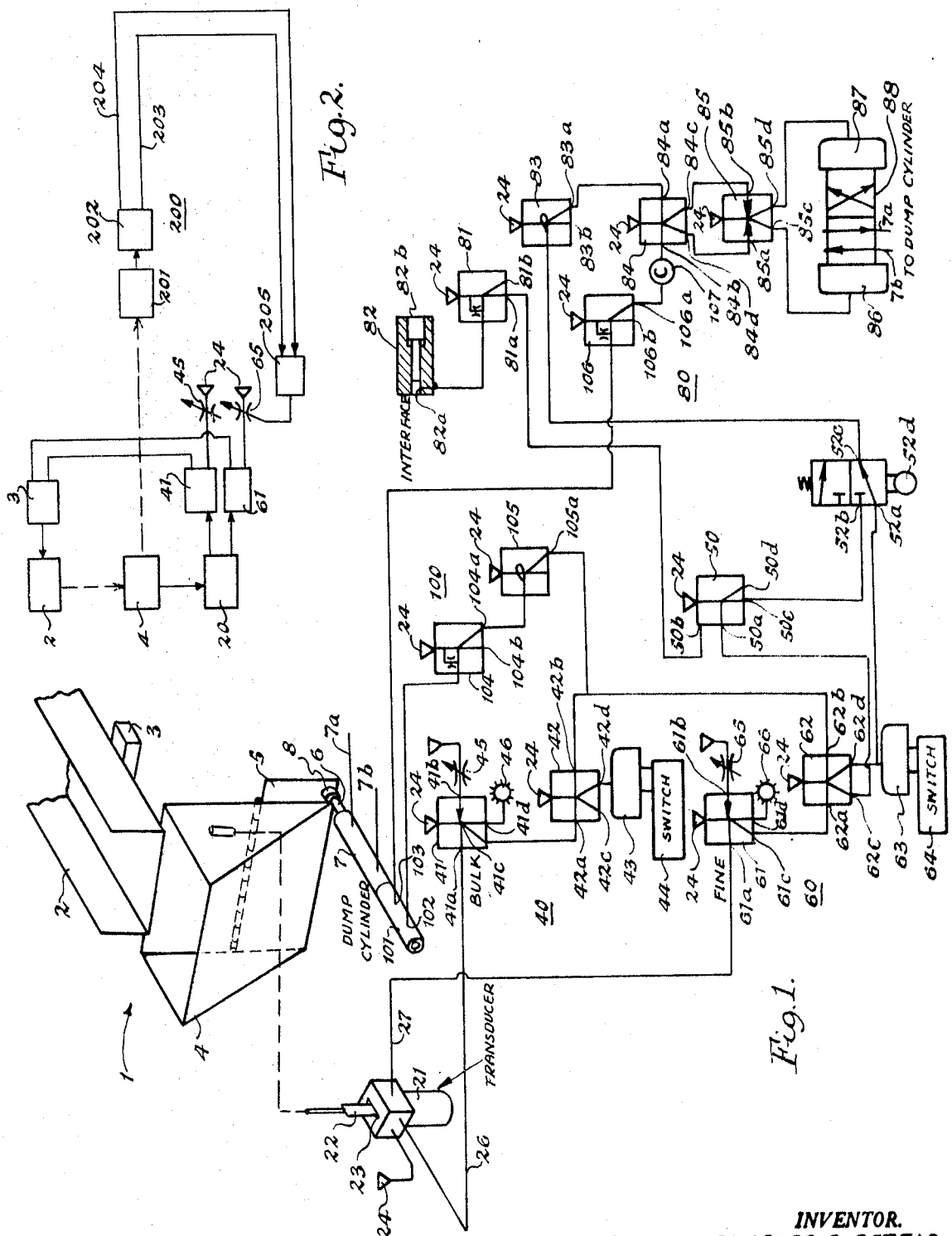

In FIG. 1, a scale device, generally designated as 1, is shown as being positioned to receive particulate material dispensed by a material-feeding chute 2 having control means, such as an electrically operated vibrator generally designated as 3, which is operable to vary the amount or volume of material dispensed into scale device 1. The operation of vibrator 3 is such as to produce a batch-feeding cycle having an initial bulk or relatively high-volume feeding portion and a final fine or relatively low-volume feeding portion.

For purposes of illustration, scale device 1 is shown as including an open topped hopper 4, which is supported by means, not shown, for vertically reciprocating movement in accordance with the weight of particulate material fed thereinto. Hopper 4 is provided with a hingedly secured material discharge gate or door 5, which when opened subsequent to the weighing operation to be described, permits dumping or discharge of a weighed batch of material from the hopper. Movement of gate 5 between its closed position, shown in FIG. 1 and its open or discharged position may be effected by alternating retracting and extending piston rod 6 of a double acting dump cylinder 7, which is suitably connected to gate 5, as at 8.

By again referring to FIG. 1, it will be understood that the control system of the present invention generally includes a fluid transducer 20, which is adapted to produce bulk and fine feed fluidic pressure control signals, which are variable in response to the weight of material deposited by chute 2 in hopper 4; a first fluidic gate circuit portion 40, which is responsive to the bulk control signal and adapted to control operation of vibrator 3 so as to terminate the initial bulk-feeding portion of the feeding cycle; a second fluidic gate portion 60, which is responsive to the fine control signal and adapted to control operation of vibrator 3, so as to terminate the final fine-feeding portion of the feeding cycle; a dumping control circuit portion 80, which is adapted to effect operation of dump cylinder 7 at the completion of the bulk feeding cycle; and a circuit portion 100, which is adapted to indicate the condition of dump cylinder 7 and ready the system for a subsequent batch-feeding cycle.

Fluid transducer 20 includes a body portion 21, which is adapted to be mounted on stationary weigher-supporting framework, not shown, and a core 22. Core 22 is supported on hopper 4 for noncontact, straight line reciprocating movement vertically within body portion slot opening or cavity 23 between a first or rest position and an adjustable final position in response to the filling of hopper 4 with a batch of material to be weighed. Thus, in the first or rest position of core 22, hopper 4 is empty and in the final position of core 22, hopper 4 is filled with a batch of material; vertical displacement of core 22 with respect to transducer body portion 21 varying as a function of the weight of material dispensed into the hopper. To simplify the present discussion, it will be assumed that the weighing apparatus is constructed so as to permit displacement of core 22 to vary linearly as to weight, although not necessary to the proper functioning of the present system.

Transducer 20 is characterized by a construction, wherein a continuous and uninterrupted supply of pressure fluid, such as clean, dry, fluidic air, indicated universaly in the drawings by drafting convention 24, is formed into a supply stream or streams of fluid, which are directed transversely of cavity 23 into a pair of output signal cavity openings, not shown. It will be understood that the signal cavity openings are spaced apart in alignment with the path of core movement within cavity 23 and that the supply fluid received thereby acts to produce bulk and fine feed fluidic control signals. The signal cavity openings are in turn disposed in fluid communication with bulk and fine feed signal output lines 26, 27, respectively. The arrangement is such that as core 22 is moved downwardly from its rest position, passage of supply fluid transversely of cavity 23 and into the signal cavity openings is progressively reduced, so as to produce decreasing bulk and fine feed fluidic control signals in output lines 26, 27, which are a function of core movement. Preferably, the transducer is constructed such that the production of a decreasing fine-feed control signal is initiated prior to the completion of reduction in the bulk feed control signal to some minimum value such as zero, and the dimension of the signal cavity openings in the direction of core movement is such that the bulk signal is produced over a greater portion of core travel than is the fine feed control signal, so as to make the latter more sensitive to core movement. A more complete description of the mode of operation and construction of transducer 20 may be had by referring to my copending application entitled VARIABLE FLUID TRANSDUCER Ser. No. 777,071 filed Nov. 19, 1968.

First and second fluidic gate circuit portions 40 and 60 are of similar design and include respectively, Schmitt triggers 41 and 61; bistable flip-flops 42 and 62; diaphragm operators 43 and 63; and electrical switches 44 and 64. Schmitt triggers 41 and 61 are of conventional construction, such that the relative pressures of trigger input signals through input ports 41a and 41b, and 61a, and 61b, determine whether the fluidic trigger output signals pass through output ports 41c or 41d and 61c or 61d, respectively. The trip or output signal switch points of triggers 41 and 61 may be selectively varied by means of adjustable biases 45 and 65, which serve to vary the pressure of the trigger input signals through input ports 41b and 61b, respectively. Thus, the operation of triggers 41 and 61 is such that the trigger outputs normally pass through output ports 41d and 61d to indicators 46 and 66 when the bulk and fine-feed control signal pressures admitted through input ports 41a, and 61a via lines 26 and 27 are in excess of the trip or switch point pressures determined by adjustable biases 45 and 65, respectively. However, when the bulk and fine-feed control signal pressures are reduced below the pressures established by biases 45 and 65, due to downward movement of core 22, the outputs of triggers 41 and 61 are switched to flip-flops 42 and 62, respectively. It will be understood that in operation the bulk trip point of Schmitt trigger 41 is reached prior to the fine trip point of Schmitt trigger 61, so that the material forming the batch dispensed into hopper 4 may be brought up to a desired weight under fine feeding control. The total batch weight may be controlled by adjusting one or both of biases 45 and 65. The biases may be of any desired construction, such as adjustable line constrictors or flow valves.

Bistable, flip-flops 42 and 62 are of conventional construction and provided with pairs of input ports 42a—42b and 62a—62b, and output ports 42c and 42d and 62c and 62d, respectively. In the present fluidic circuit, output port 42c is vented to atmosphere, whereas output port 42d is connected to diaphragm operator 43, which in turn serves to control operation of electrical switch 44. Output port 62c is connected to input port 50a of NOR gate 50, whereas output port 62d is connected to both input port 52a of shuttle valve 52 and diaphragm operator 63, which i turn serves to control operation of electrical switch 64.

NOR gate 50 and shuttle valve 52 are generally included with dumping control circuit portion 80, hereinafter to be discussed. It will be understood that the outputs of flip-flops 42 and 62 are normally through output ports 42c and 62c, but are adapted to be switched to output ports 42d and 62d, when the outputs of Schmitt triggers 41 and 61 are applied to input ports 42a and 62a.

In the arrangement illustrated, switches 44 and 64 are normally closed so as to continuously power vibrator 3 to effect bulk feeding of particular material by chute 2, and diaphragm operators 43 and 63 are employed to open the switches so as to terminate the bulk and fine feed portions of the batch feeding cycle only when exposed to fluidic outputs passing through output ports 42d and 62d, respectively. Diaphragm operators 43 and 63 may be operators No. 85—15 and switches 44 and 64 may be N.C. switches No. 80—15, which are sold by Hi-Speed Checkweigher Co., Inc., Ithaca, New York.

In accordance with the present invention, dumping control circuit portion 80 may have either an automatic or delayed response to the termination of the fine-feeding portion of the feed cycle depending upon whether shuttle valve 52 is in its first or second condition, respectively.

Shuttle valve 52 is of conventional construction having a pair of input ports 52a and 52b and a single output port 52c, which is adapted to be alternately placed in fluid communication with ports 52a and 52b by a suitable operator 52d.

Thus, in the first condition of shuttle valve 52, which is illustrated in FIG. 1, port 52c is in communication with inlet port 52a, thereby permitting circuit portion 80 to automatically respond to a fluidic signal through output port 62d of flip-flop 62.

In the second condition of shuttle valve 52, not shown, port 52c is in communication with inlet port 52b, which in turn is in communication with outlet port 50c of NOR gate 50.

NOR gate 50 is characterized by a construction such that applied fluidic source fluid 24 passes as an output signal through output port 50c only when fluidic signals applied at input ports 50a and 50b are both zero. When one or both of the signals through input ports 50a and 50b are greater than zero, the output of the NOR gate is vented to atmosphere through port 50d.

During the feeding cycle, the signal through inlet port 50a is greater than zero, since it is received from flip-flop 52 through output port 62c.

A fluidic signal greater than zero is normally applied through inlet port 50b by a back pressure switch 81, which is under the control of a suitable fluidic interface 82. Interface 82 includes a normally open back pressure port 82a, a piston operator 82b and a return spring, not shown, which normally serves to maintain the piston operator in a back pressure port in blocked position. Movement of piston operator 82b to a back pressure port blocking position may be effected by either manual or servo-controlled operating means, not shown.

Back pressure port 82a is disposed in fluid communication with switch 81, such that when port 82a is open or vented to atmosphere, switch 81 produces an output signal through port 81a disposed in communication with NOR input port 50b. However, when port 82a is blocked or closed, switch 81 produces an output signal vented to atmosphere through port 81b.

Shuttle valve output port 52c is disposed in fluid communication with a conventional one-shot fluidic switch 83, which is operable, when a fluidic signal is present at port 52c, to produce a pulse signal through its output port 83a, which is in turn disposed in fluid communication with input port 84a of of bistable fluidic flip-flop 84. The output of switch 83 is normally vented to atmosphere through output port 83b.

Flip-flop 84 includes a pair of input ports 84a and 84b and a pair of output ports 84c and 84d, which are disposed respectively, in fluid communication with input ports 85a, 85b of a digital type fluidic amplifier 85. Amplifier 85 includes a pair of output ports 85c and 85d, which are disposed in fluid communication with diaphragm operators 86 and 87 of the type described above, which in turn serve to control operation of a conventional two-position, four-way valve 88. Valve 88 is connected to dump cylinder 7 via lines 7a and 7b, which, upon operation of the valve are adapted to be alternately placed in communication with high-pressure fluid and vent lines, not shown, in order to effect extension and retraction of the dump cylinder piston 6.

The above arrangement is such that an output signal appearing at port 84c is suitably amplified and passed to diaphragm operator 86, which thereupon serves to move valve 88 into the position shown in FIG. 1 in order to pressurize line 7a and vent line 7b and thereby force piston 6 to its retracted position. When, however, a fluid signal is applied to inlet port 84a by one-shot 83, the output signal of flip-flop 84 is switched to port 84d and following amplification thereof is applied to diaphragm operator 87, which thereupon serves to move valve 88 to the left, as viewed in FIG. 1. In the latter position of valve 88, line 7b is pressurized and line 7a is vented so as to position piston 6 in its extended position for the purpose of dumping hopper 4.

Circuit portion 100 includes a suitable fluidic back pressure control operator 101, such as operator No. 85—22 sold by Hi-Speed Checkweigher, Inc., Ithaca, New York, which may be attached to one end of cylinder 7 for the purpose of indicating the condition thereof. Operator 101 is constructed such that back pressure ports 102 and 103 are alternately closed and opened to atmosphere in response to reciprocating movement of piston rod 6. Thus, in the arrangement illustrated in FIG. 1, port 102 is closed and port 103 is opened in the retracted position of piston rod 6, whereas port 102 is opened and port 103 is closed in the extended position of piston rod 6.

Port 102 is disposed in fluid communication with a conventional back pressure fluidic switch 104, which is characterized as producing an output signal through its output port 104a when port 102 is blocked and an output signal vented to atmosphere through its output port 104b when port 102 is unblocked or vented to the atmosphere. When an output signal is produced through output port 104a, a conventional one-shot fluidic switch 105 is operated to produce a pulse signal through its output port 105a, which is disposed in fluid communication with input ports 42b and 62b of flip-flops 42 and 62, respectively.

Port 103 is disposed in fluid communication with a conventional back pressure fluidic switch 106, which is characterized as producing an output signal through its output port 106a, when port 103 is blocked, and an output signal vented to atmosphere through its output port 106b, when port 103 is unblocked or vented to the atmosphere. Output port 106a is disposed in fluid communication with a can type timing capacitor 107, which is in turn placed in communication with input port 84b of bistable flip-flop 84. It will be understood that capacitor 107 is sized so as to delay retraction of dumping cylinder piston 6 for a period of time sufficient to insure complete dumping of material from hopper 4.

The operation of the control system of FIG. 1 will now be described with reference to a single batch feed cycle. At the outset, hopper 4 is empty, whereby transducer core 22 is maintained in its first or rest position, and dump cylinder piston 6 is in its retracted position. Biases 45 and 65 have been previously adjusted in order that a material of a desired batch weight may be dispensed into hopper 4. Thereafter, upon operation of vibrator 3, material is deposited in hopper 4 and core 22 is moved downwardly within transducer body portion 21 to produce a progressively decreasing bulk feed control signal When the bulk feed control signal becomes less than the trip point pressure established by bias 45, the output of Schmitt trigger 41 is shifted from indicator 46 to flip-flop 42, which in turn is shifted to operate switch 44 via diaphragm operator 43 in order to adjust vibrator 3 and terminate the bulk-feeding portion of the feed cycle. Immediately thereafter the progressively diminishing fine feed output signal produced by transducer 20 reaches a pressure less than the trip point pressure established by bias 65 to permit the output of Schmitt trigger 61 to switch from indicator 66 to flip-flop 62, which in turn is shifted to operate switch 64 via diaphragm operator 63 and effect termination of the fine feeding portion of the feed cycle. Switching of flip-flop 62 also removes the fluidic signal from input port 50a of NOR gate 50 and applies same to input port 52a of shuttle valve 52. Thereafter, flip-flops 42 and 62 remain switched, and thus vibrator 3 remains deenergized, until reset at the completion of the hopper-dumping operation.

When shuttle valve 62 is in the condition illustrated in FIG. 1, the output signal of flip-flop 62 passing through port 62d is immediately applied, via the shuttle valve, to one-shot 83. Thereupon, one-shot 83 passes a short signal pulse to port 84a of flip-flop 84, which serves to switch its output to port 84d. The output signal through port 84d, after being amplified, is applied to diaphragm operator 87, which thereupon operates valve 88 so as to extend the piston rod 6 in order to effect dumping of hopper 4. Thereafter, flip-flop 84 remains switched, and thus diaphragm operator 87 activated, until reset.

During movement of piston rod 6 towards its extended position, back pressure ports 102 and 103 are unblocked and blocked, respectively. Upon blocking of port 103, the output of back pressure switch 106 is switched to timing capacitor 107. Capacitor 107 is sized, so as to insure complete dumping of hopper 4, prior to the building up of pressure therein sufficient to effect switching or resetting of flip-flop 84 to its original position wherein its output passes through port 84c. When flip-flop 84 is reset its output after being amplified is applied to diaphragm operator 86 in order to effect retraction of dump cylinder piston 6 to its original position.

During retracting movement of piston 6, back pressure ports 102 and 103 are blocked and unblocked, respectively. With port 103 unblocked, back pressure switch 106 is permitted to return to its original condition, whereafter capacitor 107 continues to bleed into flip-flop 84, the latter remaining in its reset condition until switched during a subsequent feed cycle by a signal pulse from one-shot 83. When port 102 is blocked, the output of back pressure switch 104 is switched to one-shot 105, which thereupon applies a short duration resetting pulse to input ports 42b and 62b, in order to switch or reset flip-flops 42 and 62 to their original conditions and thus reenergize vibrator 3 and commence a subsequent feeding cycle.

Schmitt triggers 41, 61 are automatically reset during return of core 22 to its original or rest position following dumping of hopper 4.

When shuttle valve 52 is in its second condition, dumping of hopper 4 may be delayed until such time as interface piston operator 82b is manually or otherwise momentarily reciprocated for the purpose of closing or blocking back pressure port 82a. Blocking of back pressure port 82a causes shifting of back pressure switch 81, so as to remove the fluidic signal from input port 50b of the NOR gate. With signals now removed from both input ports 50a, and 50b, the output of the NOR gate is applied through ports 50c and 52b to shuttle valve output port 52c in order to effect dumping of the hopper in the manner described above.

In FIG. 2 there is schematically illustrated a weighing apparatus, wherein a check weigher 200 is employed to weigh subsequent batches of material dumped from hopper 4 and make corrective adjustments of at least fine-feed control bias 65 on a batch to batch basis when necessary to obtain desired final weight batches of material. Arrangements of this type are ofttimes employed in high-speed batch weighing operations, wherein extreme accuracy is required. Net weighing apparatus 200 forms no part of the present invention other than by its use with the control system discussed with reference to FIG. 1. Thus, it will be only generally described as including a suitable net weighing scale 201, which is adapted to receive successive batches of material deposited thereon from hopper 4; a suitable signal generator 202, which is adapted to produce in output lines 203 and 204 control signals, which are indicative of overweight and underweight conditions, respectively, of the batch deposited on scale device 201; and a bias control 205, which is adapted to proportionally adjust bias 65 in a manner determined by the overweight and underweight control signals. Thus, when signal generator 202 determines that a deposit batch is for instance overweight, bias 65 is adjusted such that the trip point pressure of Schmitt trigger 61 is increased, thereby serving to cut short the fine feed portion of the feeding cycle. Signal generator 202 and bias control 205 may be either electrical or fluidic devices, as desired; the output of bias control 205 depending on the type of bias construction employed.

If desired, the checkweighing apparatus may additionally include net material-feeding means, not shown, which are operable in response to the outputs of signal generator 202, such that additional material may be added to scale 201 in order to bring a deposited batch up to a final desired batch weight.

I claim:

1. A batch material weigher comprising in combination:
   at least one scale device movable in response to material deposited thereon;
   a material-feeding means for depositing a batch of material on said one scale device, said feeding means being adapted to produce a batch feeding cycle having an initial bulk feed portion and a final fine feed portion;
   means for dumping said one scale device;
   a fluidic air transducer, said transducer having a stationary part and a part mounted for movement with said one scale device relative to said stationary part, said transducer being adapted to produce a fluidic air pressure feed control output variable in accordance with relative movement of said parts in response to the weight of material deposited on said one scale device;
   a first fluidic air gate means responsive to said feed control output for terminating the bulk feed portion of said cycle;
   a second fluidic air gate means responsive to said feed control output for terminating the fine feed portion of said cycle and for initiating operation of said dumping means; and
   means for adjustably controlling said batch-feeding cycle to maintain the weight of said batch within desired limits.

2. A batch material weigher comprising in combination:
   at least one scale device movable in response to material deposited thereon;
   a material feeding means for depositing a batch of material on said one scale device, said feeding means being adapted to produce a batch feeding cycle having an initial bulk feed portion and a final fine feed portion;

means for dumping said one scale device, said dumping means including fluidic means to indicate the condition of said dumping means;

a fluid transducer, said transducer having a stationary part and a part mounted for movement with said one scale device relative to said stationary part, said transducer being adapted to produce a fluidic pressure feed control output variable in accordance with relative movement of said parts in response to the weight of material deposited on said one scale device;

a first fluidic gate means responsive to said feed control output for terminating the bulk feed portion of said cycle;

a second fluidic gate means responsive to said feed control output for terminating the fine feed portion of said cycle, said second gate means being adapted to initiate operation of said dumping means; and means for adjustably controlling said batch-feeding cycle to maintain the weight of said batch within said desired limits, and said condition indicating means serving to control operation of said gate means to permit initiation of a subsequent batch-feeding cycle.

3. A batch material weigher comprising in combination:

at least one scale device movable in response to material deposited thereon;

a material feeding means for depositing a batch of material on said one scale device, said feeding means being adapted to produce a batch-feeding cycle having an initial bulk feed portion and a final fine feed portion;

means for dumping said one scale device, said dumping means includes a fluidic NOR gate, means to apply a first input signal to said NOR gate and means operable to turn off said first input signal;

a fluid transducer, said transducer having a stationary part and a part mounted for movement with said one scale device relative to said stationary part, said transducer being adapted to produce a fluidic pressure feed control output variable in accordance with relative movement of said parts in response to the weight of material deposited on said one scale device;

a first fluidic gate means responsive to said feed control output for terminating the bulk feed portion of said cycle;

a second fluidic gate means responsive to said feed control output for terminating the fine feed portion of said cycle, said second gate means includes a bistable flip-flop fluidic device, said bistable flip-flop being alternately in first and second conditions when said second gate means is responsive and nonresponsive to said feed control output, said bistable flip-flop producing a second input signal to said NOR gate only when in said second condition, said NOR gate producing an output signal to effect dumping of said scale device when said first input signal is turned off and said bistable flip-flop is in said first condition; and means for adjustably controlling said batch feeding cycle to maintain the weight of said batch within desired limits.

4. A batch material weigher comprising in combination:

at least one scale device movable in response to material deposited thereon;

a material-feeding means for depositing a batch of material on said one scale device, said feeding means being adapted to produce a batch feeding cycle having an initial bulk feed portion and a final fine feed portion;

means for dumping said one scale device;

a fluid transducer, said transducer having a stationary part and a part mounted for movement with said one scale device relative to said stationary part, said transducer being adapted to produce a fluidic pressure feed control output variable in accordance with relative movement of said parts in response to the weight of material deposited on said one scale device said feed control output including separate bulk and fine-feed control signals;

a first fluidic gate means responsive to said bulk feed control signal for terminating the bulk feed portion of said cycle;

a second fluidic gate means responsive to said fine-feed control signal for terminating the fine feed portion of said cycle, each of said fluidic gate means including a Schmitt trigger, said bulk feed control signal being a first input to one of said triggers, said fine-feed control signal being a first input to another of said triggers, said triggers having outputs switchable to effect termination of said cycle feed portions; and means for adjustably controlling said batch feeding cycle to maintain the weight of said batch within desired limits, said adjustable control means being provided one for each of said gate means and providing adjustable second inputs to said triggers, said second inputs defining the switch points for the outputs of said trigger so as to control response thereof to said feed control signals.

5. A batch material weigher comprising in combination:

at least one scale device movable in response to material deposited thereon;

a material feeding means for depositing a batch of material on said one scale device, said feeding means being adapted to produce a batch feeding cycle having an initial bulk feed portion and a final fine-feed portion;

means for dumping said one scale device, said dumping means including fluidic means to indicate the condition of said dumping means;

a fluidic transducer, said transducer having a stationary part and a part mounted for movement with said one scale device relative to said stationary part, said transducer being adapted to produce a fluidic air pressure feed control output variable in accordance with relative movement of said parts in response to the weight of material deposited on said one scale device;

a first fluidic air gate means responsive to said feed control output for terminating the bulk feed portion of said cycle;

a second fluidic air gate means responsive to said feed control output for terminating the fine-feed portion of said cycle, each of said gate means includes a bistable flip-flop fluidic device, said flip-flops being alternately in first and second conditions when said gate means are responsive and nonresponsive to said feed control output, said flip-flops when in said first condition producing output signals terminating said cycle portions of said feeding means said output signal produced by the flip-flop of said second gate means when in said first condition being adapted to initiate operation of said dumping means, and said condition indicating means being adapted at the completion of scale device dumping to return said flip-flops to said second condition to permit initiation of a subsequent batch feeding cycle; and means for adjustably controlling said batch-feeding cycle to maintain the weight of said batch within desired limits.

6. A batch material weigher comprising in combination:

a first scale device movable in response to material deposited thereon;

a material feeding means for depositing a batch of material on said first scale device, said feeding means being adapted to produce a bulk feeding cycle having an initial bulk feed portion and a final fine feed portion;

means for dumping said first scale device;

a fluid transducer, said transducer having a stationary part and a part mounted for movement with said first scale device relative to said stationary part, said transducer being adapted to produce a fluidic pressure feed control output variable in accordance with relative movement of said parts in response to the weight of material deposited on said first scale device;

a first fluidic gate means responsive to said feed control output for terminating the bulk feed portion of said cycle;

a second fluidic gate means responsive to said feed control output for terminating the fine feed portion of said cycle;

means for adjustably controlling said batch-feeding cycle to maintain the weight of said batch within desired limits; and a second scale device for receiving said batch deposited thereon from said first scale device, said second scale device having associated therewith means to generate signals indicating overweight and underweight conditions of said deposited batch, said indicating signals controlling said adjustable control means when said deposited batch varies beyond said desired limits.

7. A weigher according to claim 6, wherein said adjustable control means controls response of said second gate means to said feed control output.

8. A batch material weigher comprising in combination:
at least one scale device movable in response to material deposited thereon;
a material feeding means for depositing a batch of material on said one scale device, said feeding means being adapted to produce a batch-feeding cycle having an initial bulk feed portion and a final fine-feed portion;
means for dumping said one scale device;
a fluidic transducer, said transducer having a stationary part and a part mounted for movement with said one scale device relative to said stationary part, said transducer being adapted to produce a fluidic pressure feed control output variable in accordance with relative movement of said parts in response to the weight of material deposited on said one scale device;
a first fluidic gate means having feed and no-feed conditions, said first gate means being responsive to said feed control output for change from said feed into said no-feed condition thereof thereby to terminate the bulk feed portion of said cycle;
a second fluidic gate means having feed and no-feed conditions, said second gate means being responsive to said feed control output for change from said feed into said no-feed condition thereof thereby to terminate the fine-feed portion of said cycle; and
means responsive to operation of said dumping means for returning said first and second gate means to said feed condition thereof thereby to initiate said feeding cycle.

9. A weigher as set forth in claim 8, wherein said second fluidic gate means initiates operation of said dumping means when changed into said no-feed condition thereof.